United States Patent
Lee et al.

(10) Patent No.: US 9,419,294 B2
(45) Date of Patent: Aug. 16, 2016

(54) METHOD AND APPARATUS FOR CONTROLLING OPERATION OF REDOX FLOW BATTERY

(71) Applicant: OCI COMPANY LTD., Seoul (KR)

(72) Inventors: Ji-Young Lee, Seongnam-si (KR); Seung-Yoen Lee, Seongnam-si (KR); Jae-Min Kim, Seongnam-si (KR); Soo-Whan Kim, Seongnam-si (KR); Hee-Chang Ye, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 84 days.

(21) Appl. No.: 14/572,152

(22) Filed: Dec. 16, 2014

(65) Prior Publication Data

US 2015/0180068 A1    Jun. 25, 2015

(30) Foreign Application Priority Data

Dec. 24, 2013 (KR) .......................... 10-2013-0162275

(51) Int. Cl.

| | | |
|---|---|---|
| *H01M 8/06* | (2016.01) | |
| *H01M 8/04* | (2016.01) | |
| *H01M 8/18* | (2006.01) | |
| *H01M 8/20* | (2006.01) | |
| *H01M 10/48* | (2006.01) | |

(52) U.S. Cl.
CPC ...... *H01M 8/04611* (2013.01); *H01M 8/04552* (2013.01); *H01M 8/04865* (2013.01); *H01M 8/188* (2013.01); *H01M 8/20* (2013.01); *H01M 10/484* (2013.01); *Y02E 60/528* (2013.01)

(58) Field of Classification Search
CPC ..................... H01M 8/04552; H01M 8/04611; H01M 8/04865; H01M 8/188; H01M 8/20; Y02E 60/528
See application file for complete search history.

(56) References Cited

U.S. PATENT DOCUMENTS

2010/0003586 A1\* 1/2010 Sahu ................... H01M 8/1016
429/101

FOREIGN PATENT DOCUMENTS

| JP | 2008527647 A | 7/2008 |
|---|---|---|
| WO | 9003666 A1 | 4/1990 |

OTHER PUBLICATIONS

Ao Tang et al, "Dynamic modelling of the effects of ion diffusion and side reactions on the capacity loss for vanadium redox flow battery", Journal of Power Sources, Sep. 7, 2011, pp. 10737-10747, vol. 196, No. 24, Elsevier B.V.

(Continued)

*Primary Examiner* — Patrick Ryan
*Assistant Examiner* — Ben Lewis
(74) *Attorney, Agent, or Firm* — Hauptman Ham, LLP

(57) ABSTRACT

A method and apparatus for controlling operation of a redox flow battery. The method of controlling operation of a redox flow battery includes obtaining a diffusivity of anolyte ions with respect to a separator, obtaining a diffusivity of catholyte ions with respect to the separator, determining electrolyte diffusivities depending upon a state of charge value of the redox flow battery based on the diffusivity of the anolyte ions and the diffusivity of the catholyte ions, determining a minimum state of charge value and a maximum state of charge value of the redox flow battery based on the electrolyte diffusivities, and setting operating conditions of the redox flow battery based on the minimum state of charge value and the maximum state of charge value. The method and apparatus for controlling operation of a redox flow battery can prevent reduction in capacity of the redox flow battery.

14 Claims, 12 Drawing Sheets

(56) References Cited

OTHER PUBLICATIONS

Wei Wang et al, "Recent Progress in Redox Flow Battery Research and Development", Advanced Functional Materials, Sep. 4, 2012, pp. 970-986, vol. 23, No. 8, WILEY-VCH Verlag GmbH & Co. KGaA, Weinheim.

European Search Report dated May 4, 2015 in connection with the counterpart European Patent Application No. 14198817.0, citing the above reference(s).

Korean Notice of Allowance dated Jul. 30, 2015 in connection with the counterpart Korean Patent Application No. 10-2013-0162275, citing the above reference(s).

* cited by examiner

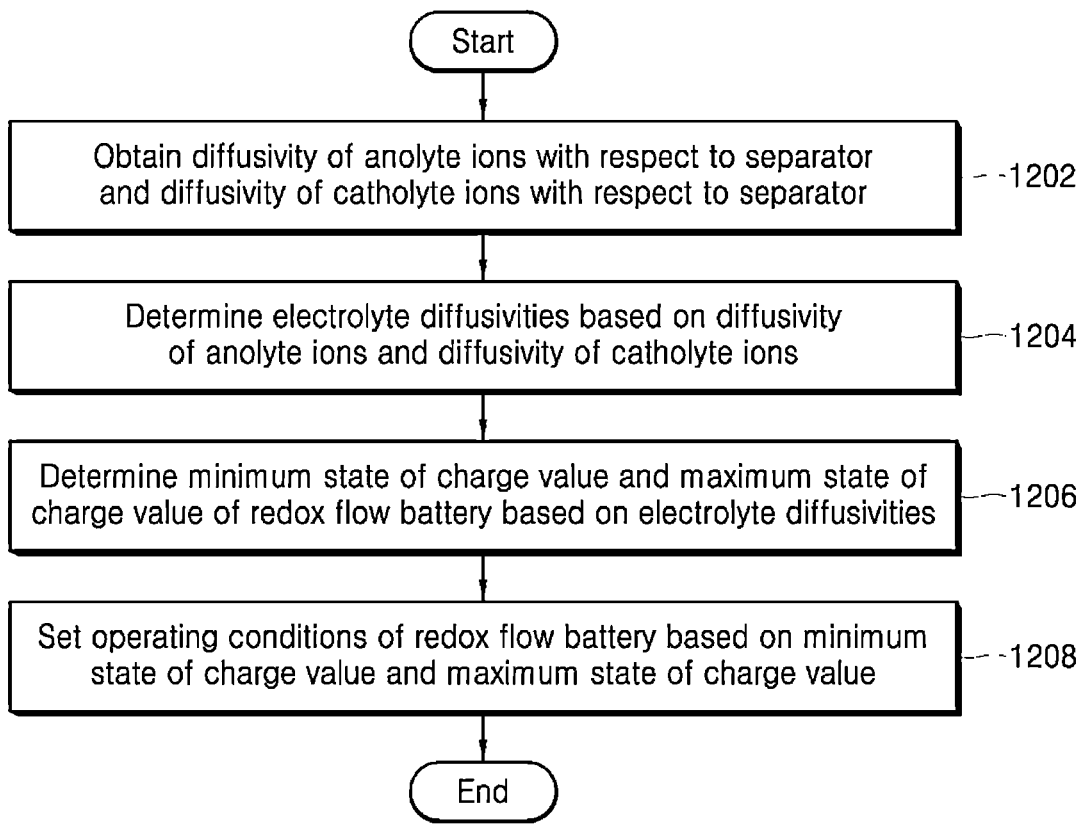

METHOD AND APPARATUS FOR CONTROLLING OPERATION OF REDOX FLOW BATTERY

CROSS REFERENCE TO RELATED APPLICATION

This application claims the benefit of Korean Patent Application No. 10-2013-0162275, filed on Dec. 24, 2013, entitled "METHOD AND APPARATUS FOR CONTROLLING OPERATION OF REDOX FLOW BATTERY", which is hereby incorporated herein by reference in its entirety.

BACKGROUND

1. Technical Field

The present invention relates to a method and apparatus for controlling operation of a redox flow battery.

2. Description of the Related Art

A redox flow battery refers to an electrochemical electricity storage device which charges or discharges electricity through oxidation/reduction of ions contained in an electrolyte. In such a redox flow battery, an anolyte and a catholyte composed of different kinds of active materials are separated from each other by a separator.

Ion crossover occurs through the separator and the amount of ions exchanged through the separator varies according to the kind of active material, that is, the oxidation number of ions, so that the amount of one of the catholyte and the anolyte increases. Such unbalanced crossover breaks a capacitive balance between the catholyte and the anolyte and reduces use rate of electrolyte solutions, thereby causing reduction in capacity of the battery.

To solve the problem of capacity reduction of the redox flow battery, a method of mixing the anolyte and the catholyte or a method of migrating one of the electrolyte solutions from one storage tank to another storage tank containing the other electrolyte solution is used in the related art. However, mixing or migration of the electrolyte solutions requires a separate energy source and a considerable time in solving the problem of capacity reduction. Moreover, the method of mixing the electrolyte solutions under certain conditions has a drawback of consumption of energy charged in the battery.

BRIEF SUMMARY

Aspects of the present invention provide a method and apparatus for controlling operation of a redox flow battery, which can prevent reduction in capacity of the redox flow battery.

In addition, aspects of the present invention provide a method and apparatus for controlling operation of a redox flow battery, which can prevent reduction in capacity of the redox flow battery without an additional process such as mixing or migration of electrolyte solutions and additional cost burden caused thereby.

Further, aspects of the present invention provide a method and apparatus for controlling operation of a redox flow battery, which can secure continuous and stable operation of the redox flow battery for a long period of time without stopping operation of the battery for overhauling.

The present invention is not limited to these aspects, and other aspects and advantages of the present invention not mentioned above will be understood through the following description, and more clearly understood from exemplary embodiments of the present invention. In addition, it will be easily appreciated that the aspects and advantages are realized by features and combination thereof as set forth in claims.

In accordance with one aspect of the present invention, a method of controlling operation of a redox flow battery includes: obtaining a diffusivity of anolyte ions with respect to a separator; obtaining a diffusivity of catholyte ions with respect to the separator; determining electrolyte diffusivities depending upon a state of charge value of the redox flow battery based on the diffusivity of the anolyte ions and the diffusivity of the catholyte ions; determining a minimum state of charge value and a maximum state of charge value of the redox flow battery based on the electrolyte diffusivities; and setting operating conditions of the redox flow battery based on the minimum state of charge value and the maximum state of charge value.

In accordance with another aspect of the present invention, an apparatus for controlling operation of a redox flow battery includes: a diffusivity determination unit that obtains a diffusivity of anolyte ions with respect to a separator and a diffusivity of catholyte ions with respect to the separator and determines electrolyte diffusivities depending upon a state of charge value of the redox flow battery based on the diffusivity of the anolyte ions and the diffusivity of the catholyte ions; a first operating condition setting unit that sets a minimum state of charge value and a maximum state of charge value of the redox flow battery based on the electrolyte diffusivities; and a second operating condition setting unit that sets operating conditions of the redox flow battery based on the minimum state of charge value and the maximum state of charge value.

As described above, according to the present invention, there is an advantage of preventing reduction in capacity of a redox flow battery.

In addition, according to the present invention, there is an advantage of preventing reduction in capacity of the redox flow battery without an additional process such as mixing or migration of electrolyte solutions and additional cost burden caused thereby.

Further, according to the present invention, there is an advantage of securing continuous and stable operation of the redox flow battery for a long period of time without stopping operation of the battery for overhauling.

BRIEF DESCRIPTION OF THE DRAWINGS

The above and other aspects, features, and advantages of the present invention will become apparent from the detailed description of the following embodiments in conjunction with the accompanying drawings, in which:

FIG. 12 is a flowchart of a method of controlling operation of a redox flow battery according to one embodiment of the present invention.

DETAILED DESCRIPTION

Figure 1:
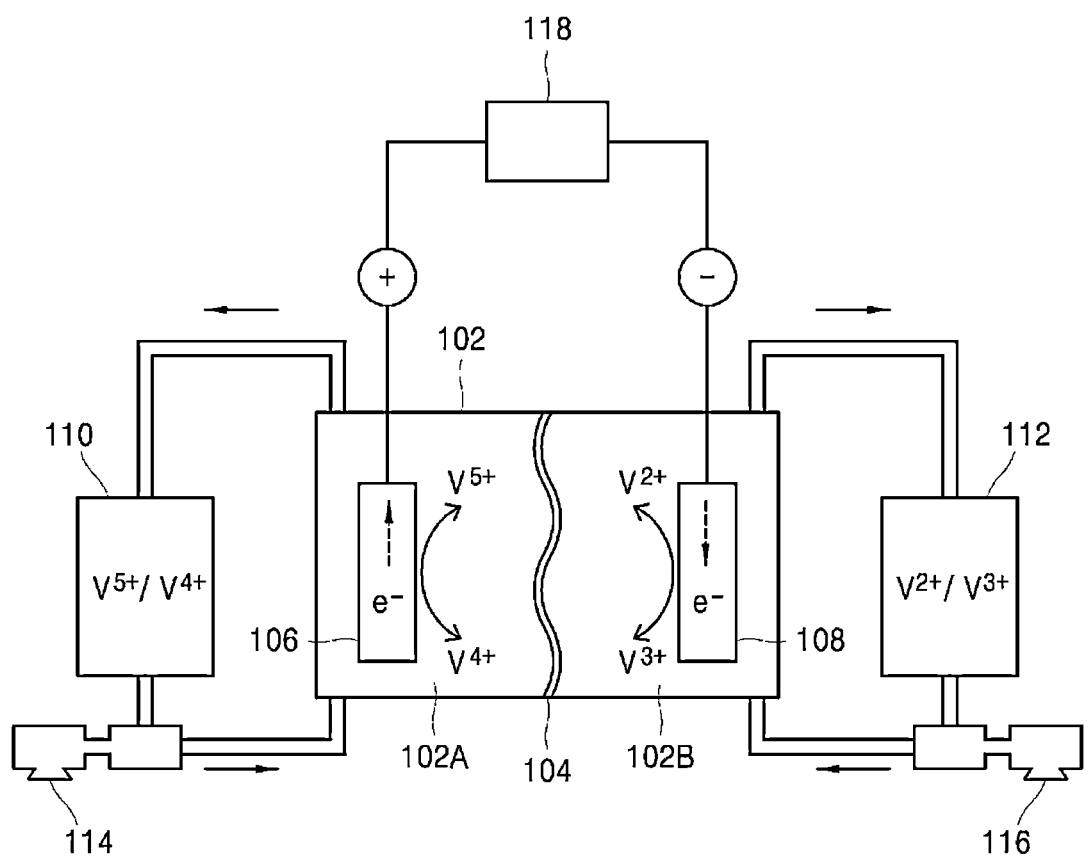
FIG. 1 is a diagram of a redox flow battery controlled by a method and apparatus for controlling operation of a redox flow battery according to the present invention.

Hereinafter, exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. Herein, detailed descriptions of components and functions apparent to those skilled in the art will be omitted for clarity. Like components will be denoted by like reference numerals throughout the specification and the accompanying drawings.

FIG. 1 is a diagram of a redox flow battery controlled by a method according to the present invention.

Referring to FIG. 1, an anolyte (anode electrolyte solution) is stored in an anolyte storage tank 110 and a catholyte (cathode electrolyte solution) is stored in a catholyte storage tank 112.

The catholyte may include n-valence ions and (n+1)-valance ions as catholyte ions, and the anolyte may include m valence ions and (m+1)-valence ions as anolyte ions. At this time, n and m are integers and n, n+1, m and m+1 are different from one another. For example, the catholyte may include two-valence vanadium ions ($V^{2+}$) or three-valence vanadium ions ($V^{3+}$) ions as catholyte ions, and the anolyte may include four-valence vanadium ions ($V^{4+}$) or five-valence vanadium ions ($V^{5+}$) as anolyte ions. Although the present invention will be described with reference to the embodiment wherein the redox flow battery contains vanadium ions ($V^{5+}, V^{4+}, V^{2+}, V^{3+}$) as shown in FIG. 1, it should be understood that the present invention may also be applied to redox flow batteries which include the same kind of element in the anolyte and the catholyte instead of the vanadium ions.

The anolyte and the catholyte stored in the anolyte storage tank 110 and the catholyte storage tank 112 are introduced into an anode cell 102A and a cathode cell 102B of a cell 102 through pumps 114, 116, respectively. In the anode cell 102A, migration of electrons occurs through an electrode 106 by operation of a power source/load 118 such that oxidation/reduction represented by $V^{5+} \leftrightarrows V^{4+}$ occurs. Similarly, in the cathode cell 102B, migration of electrons occurs through an electrode 108 by operation of the power source/load 118 such that oxidation/reduction represented by $V^{2+} \leftrightarrows V^{3+}$ occurs. After oxidation/reduction, the anolyte and the catholyte are circulated to the anolyte storage tank 110 and the catholyte storage tank 112, respectively.

On the other hand, the anode cell 102A and the cathode cell 102B are separated from each other by a separator 104 which allows ions to pass therethrough. With this structure, migration of ions, that is, crossover, can occur between the anode cell 102A and the cathode cell 102B. That is, in the course of charging/discharging the redox flow battery, anolyte ions ($V^{5+}, V^{4+}$) in the anode cell 102A can migrate into the cathode cell 102B and catholyte ions ($V^{2+}, V^{3+}$) in the cathode cell 102B can migrate into the anode cell 102A.

Figure 2:
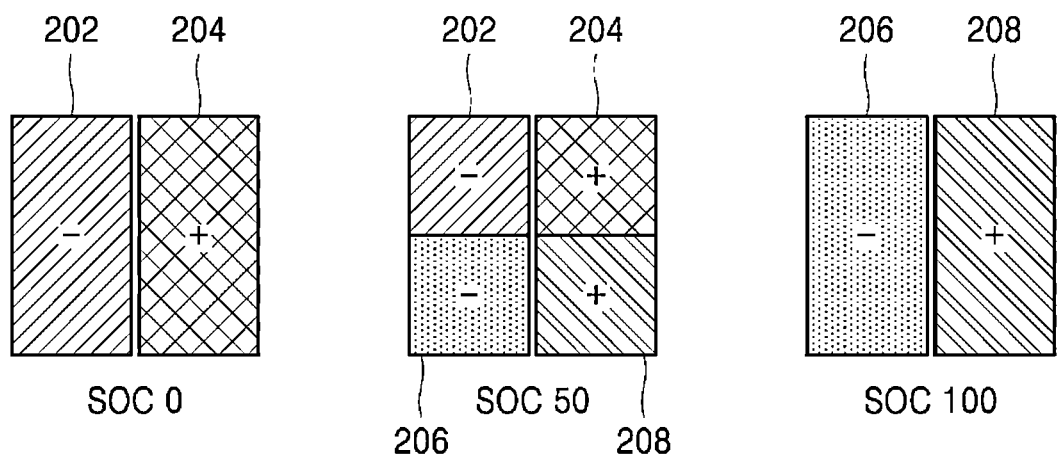
FIG. 2 shows variation of compositions of an anolyte and a catholyte depending upon a state of charge value of a redox flow battery.

FIG. 2 shows variation of compositions of an anolyte and a catholyte depending upon a state of charge value of a redox flow battery.

In FIG. 2, (−) denotes a cathode cell and (+) denotes an anode cell. In theory, as shown in FIG. 2, at a state of charge (SOC) value of 0, $V^{3+}$ ions 202 are present substantially alone in the cathode cell, and $V^{4+}$ ions 204 are present substantially alone in the anode cell. Then, when charging is initiated and the SOC value reaches 50%, each of the $V^{3+}$ ions 202 and the $V^{2+}$ ions 206 is present in an amount of about 50% in the cathode cell and each of the $V^{4+}$ ions 204 and the $V^{5+}$ ions 208 is present in an amount of about 50% in the anode cell. Then, when charging is completed (that is, when the SOC value reaches 100%), the $V^{2+}$ ions 206 remain alone in the cathode cell and the $V^{5+}$ ions 208 remain alone in the anode cell.

However, in practice, the size or electrochemical characteristics of ions can be changed according to the oxidation number of ions to provide different diffusivities when the ions pass through the separator, thereby causing imbalance of crossover. As a result, a theoretical amount of the ions in a specific charge state is different from an actual amount of the ions. That is, migration of ions having a higher diffusivity with respect to the separator occurs more actively than migration of ions having a lower diffusivity with respect to the separator. As a result, upon change of the SOC value, the amount of ions increases in one of the anode cell and the cathode cell and decreases in the other cell. Accordingly, the amount of active materials, which substantially fail to participate in oxidation/reduction in the redox flow battery, decreases, thereby causing reduction in capacity of the redox flow battery. Herein, the diffusivity of ions is defined as the amount of ions passing through a unit area of the separator per unit time.

On the other hand, the aforementioned crossover differently occurs depending upon the kind and properties of separator used in a cell. This is because the diffusivity of ions passing through the separator differs due to electrochemical properties and microscopic structure of the separator. In order to prevent reduction in battery capacity caused by such imbalanced crossover, it is necessary to set a suitable state of charge value of the redox flow battery in consideration of the properties of the separator used therein.

The present invention is based on such consideration and aimed at controlling operation of the redox flow battery such that net migration amounts of anolyte ions and catholyte ions become 0 in overall operation of the battery by application of a suitable state of charge value according to the properties of the separator used in the redox flow battery.

Figure 3:
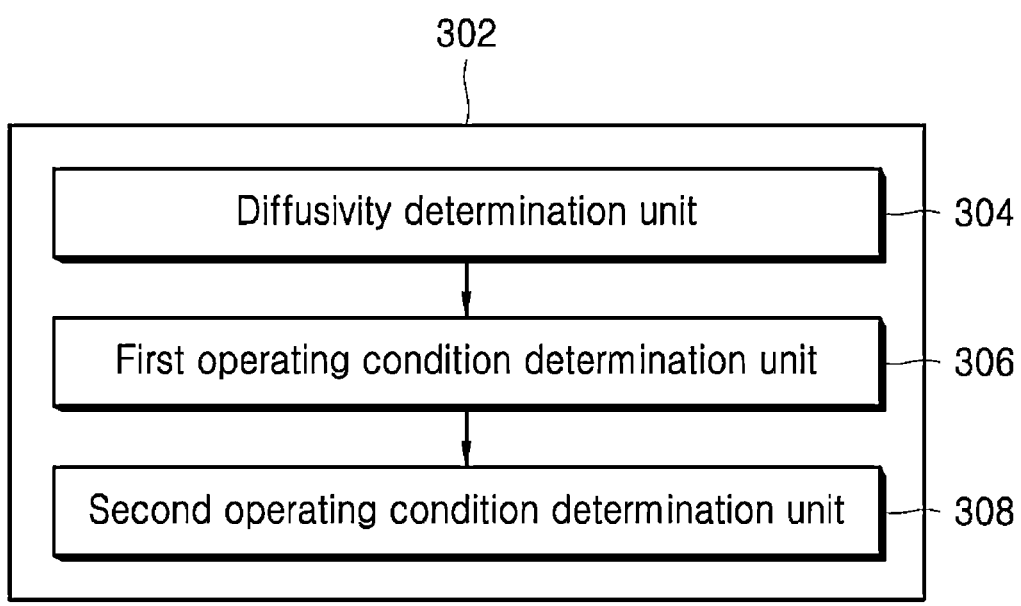
FIG. 3 is a block diagram of an apparatus for controlling operation of a redox flow battery according to one embodiment of the present invention.

FIG. 3 is a block diagram of an apparatus for controlling operation of a redox flow battery according to one embodiment of the present invention.

Referring to FIG. 3, the apparatus for controlling operation of a redox flow battery 302 according to one embodiment of the invention includes a diffusivity determination unit 304, a first operating condition setting unit 306, and a second operating condition setting unit 308.

The diffusivity determination unit 304 obtains a diffusivity of anolyte ions with respect to a separator and a diffusivity of catholyte ions with respect to the separator, and determines electrolyte diffusivities based on the diffusivity of the anolyte ions and the diffusivity of the catholyte ion.

The diffusivities of the anolyte ions and catholyte ions with respect to the separator used in the redox flow battery may be experimentally obtained by a typical method or apparatus for measuring diffusivity. In this way, the diffusivity determination unit 304 obtains the diffusivity of the anolyte ions and the diffusivity of the catholyte ions. In one embodiment, when the catholyte ions include $V^{2+}$ ions and $V^{3+}$ ions and the anolyte ions include $V^{3+}$ ions and $V^{4+}$ ions, the diffusivity determination unit 304 may obtain a diffusivity of each of these four kinds of ions.

Then, the diffusivity determination unit 304 determines the electrolyte diffusivities depending upon a state of charge value of the redox flow battery based on the diffusivity of the anolyte ions and the diffusivity of the catholyte ions. The electrolyte diffusivities depending upon the state of charge value may be determined from a catholyte diffusivity calculated based on the diffusivity of the catholyte ions and an anolyte diffusivity calculated based on the diffusivity of the anolyte ions.

More specifically, the diffusivity determination unit 304 calculates the anolyte diffusivity depending upon the state of charge value of the redox flow battery. For example, the diffusivity determination unit 304 may determine a diffusivity of $V^{5+}$ ions as the anolyte diffusivity when the redox flow battery has a state of charge value of 0, and may determine a diffusivity of $V^{4+}$ ions as the anolyte diffusivity when the redox flow battery has a state of charge value of 100.

Similarly, the diffusivity determination unit 304 calculates the catholyte diffusivity depending upon the state of charge value of the redox flow battery. For example, the diffusivity determination unit 304 may determine a diffusivity of $V^{2+}$ ions as the catholyte diffusivity when the redox flow battery has a state of charge value of 0, and may determine a diffusivity of $V^{3+}$ ions as the catholyte diffusivity when the redox flow battery has a state of charge value of 100.

At this time, the diffusivity determination unit 304 may generate a curve depicting the diffusivities of the anolyte and the diffusivities of the catholyte when the state of charge values are 0 and 100. In this graph, a linear relationship is provided between the state of charge value and each of the anolyte diffusivity and the catholyte diffusivity.

An anolyte diffusivity curve depicting variation of the anolyte diffusivity depending upon the state of charge value satisfies the following Equation 1 at a specific state of charge value.

Anolyte Diffusivity=state of charge value×(diffusivity of ($m$+1)-valence ions)+(100−state of charge value)×(diffusivity of $m$-valence ions)  <Equation 1>

In addition, a catholyte diffusivity curve depicting variation of the catholyte diffusivity depending upon the state of charge value satisfies the following Equation 2 at a specific state of charge value.

Catholyte Diffusivity=state of charge value×(diffusivity of $n$-valence ions)+(100−state of charge value)×(diffusivity of ($n$+1)-valence ions)  <Equation 2>

On the other hand, when detecting variation in temperature of the redox flow battery, the diffusivity determination unit 304 performs operation of obtaining the diffusivity of the anolyte ions and operation of obtaining the diffusivity of the catholyte ions. That is, the redox flow battery further includes a temperature sensing unit (not shown) connected to the diffusivity determination unit 304 to detect temperature variation of the redox flow battery. Thus, when the temperature sensing unit (not shown) detects the temperature variation of the redox flow battery and sends a signal indicating temperature variation to the diffusivity determination unit 304, the diffusivity determination unit 304 may obtain the diffusivity of the anolyte ions and the diffusivity of the catholyte ions at this time point. The diffusivity of the anolyte ions and the diffusivity of the catholyte ions may vary depending upon temperature, and operation of the redox flow battery may be controlled based on the diffusivities of the ions that vary depending upon temperature. The temperature sensing unit may sense the temperature variation in real time or in a predetermined cycle, and may be operated to send a signal to the diffusivity determination unit 304 when the temperature variation reaches a preset critical value.

The first operating condition setting unit 306 determines a minimum state of charge value and a maximum state of charge value of the redox flow battery based on the determined electrolyte diffusivities. More specifically, the first operating condition setting unit 306 sets a state of charge value when the anolyte diffusivity is coincident with the catholyte diffusivity as a medium state of charge value, and determines the minimum state of charge value and the maximum state of charge value according to the following Equation 3.

Minimum state of charge value=Medium state of charge value−$P$

Maximum state of charge value=Medium state of charge value+$Q$  <Equation 3>

In this equation, P and Q are the same integers greater than 0. In addition, the minimum state of charge value is greater than or equal to 0 and the maximum state of charge value is less than or equal to 100.

The first operating condition setting unit 306 may determine the minimum/maximum state of charge values such that a difference between the minimum state of charge value and the maximum state of charge value has a maximum value while satisfying the above requirements.

The second operating condition setting unit 308 sets operating conditions of the redox flow battery based on the minimum state of charge value and the maximum state of charge value determined as above. More specifically, the second operating condition setting unit 308 detects a minimum voltage corresponding to the minimum state of charge value and a maximum voltage corresponding to the maximum state of charge value using an open circuit voltage (OCV) graph of the redox flow battery, and sets the minimum voltage and the maximum voltage as operating voltages of the redox flow battery.

Next, a method of controlling operation of a redox flow battery according to the present invention will be described in more detail with reference to examples.

EXAMPLE 1

In Example 1, operating conditions of a redox flow battery using separator A are set as follows.

First, each of diffusivities of anolyte ions and catholyte ions with respect to the separator A is measured. Anolyte ions ($V^{4+}$, $V^{5+}$) and catholyte ions ($V^{2+}$, $V^{3+}$) have the following diffusivities with respect to the separator A, as measured by a method known in the art.

Diffusivity of $V^{2+}$ ions with respect to separator A: 2.7
Diffusivity of $V^{3+}$ ions with respect to separator A: 1.0

Diffusivity of $V^{4+}$ ions with respect to separator A: 2.1
Diffusivity of $V^{5+}$ ions with respect to separator A: 1.8

After obtaining such diffusivities of the anolyte ions and catholyte ions with respect to the separator A, the diffusivity determination unit 304 determines electrolyte diffusivities, that is, an anolyte diffusivity and a catholyte diffusivity, based on the diffusivity of the anolyte ions and the diffusivity of the catholyte ions obtained as above. Thereafter, the diffusivity determination unit 304 generates a graph depicting the electrolyte diffusivities depending upon state of charge values based on the anolyte diffusivity and the catholyte diffusivity determined as above.

Figure 4:
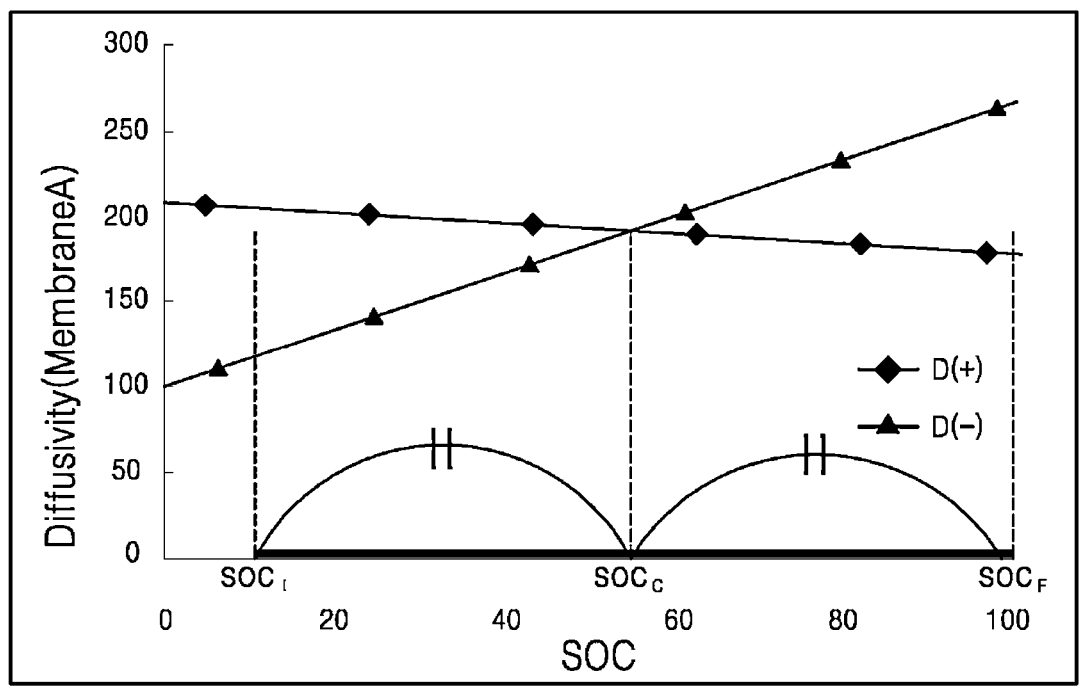
FIG. 4 is a graph depicting electrolyte diffusivities with respect to separator A in Example 1 of the present invention.

FIG. 4 is a graph depicting electrolyte diffusivities with respect to the separator A in Example 1 of the present invention. In FIG. 4, the abscissa indicates state of charge values, the ordinate indicates diffusivities, and numerals of the ordinate are given by scaling measured diffusivities by 100 times for convenience of comparison.

In FIG. 4, D(+) indicates an anolyte diffusivity and D(−) indicates a catholyte diffusivity. The diffusivity determination unit 304 determines the obtained diffusivity (2.1) of $V^{4+}$ ions as an anolyte diffusivity when the redox flow battery has a state of charge value of 0, and determines the obtained diffusivity (1.8) of $V^{5+}$ ions as an anolyte diffusivity when the redox flow battery has a state of charge value of 100, in which a straight line connecting the obtained diffusivities indicates anolyte diffusivities with respect to the separator A. Here, at a specific state of charge value greater than 0 and less than 100, the anolyte diffusivities are determined so as to satisfy Equation 1.

Similarly, the diffusivity determination unit 304 determines the obtained diffusivity (1.0) of $V^{3+}$ ions as a catholyte diffusivity when the redox flow battery has a state of charge value of 0, and determines the obtained diffusivity (2.7) of $V^{2+}$ ions as a catholyte diffusivity when the redox flow battery has a state of charge value of 100, in which a straight line connecting the obtained diffusivities indicates catholyte diffusivities with respect to the separator A. Here, at a specific state of charge value greater than 0 and less than 100, the catholyte diffusivities are determined so as to satisfy Equation 2.

The first operating condition setting unit 306 determines a minimum state of charge value and a maximum state of charge value of the redox flow battery based on the graph of the electrolyte diffusivity as shown in FIG. 4. The first operating condition setting unit 306 sets, as a medium state of charge value ($SOC_C$), a state of charge value when the anolyte diffusivity is coincident with the catholyte diffusivity, as shown in FIG. 4. Then, the minimum state of charge value ($SOC_I$) is determined by subtracting a certain value from this medium state of charge value, and the maximum state of charge value ($SOC_F$) is determined by adding the certain value to this medium state of charge value.

For example, in FIG. 4 in which the medium state of charge value is 55, the maximum state of charge value is determined to be 55+45=100 and the minimum state of charge value is determined to be 55−45=10. That is, in FIG. 4, the maximum state of charge value and the minimum state of charge value are determined by adding and subtracting the same value (45) to or from the medium state of charge value, respectively. When the medium state of charge value is 55, although the maximum/minimum state of charge values may be provided as various values depending upon P and Q values, the redox flow battery may be operated in an SOC range of 10 to 100, in which a difference between the maximum state of charge value and the minimum state of charge value has a maximum value while the maximum state of charge value does not exceed 100. In addition, as can be seen from FIG. 4, the minimum state of charge value is greater than or equal to 0 and the maximum state of charge value is less than or equal to 100.

Figure 5:
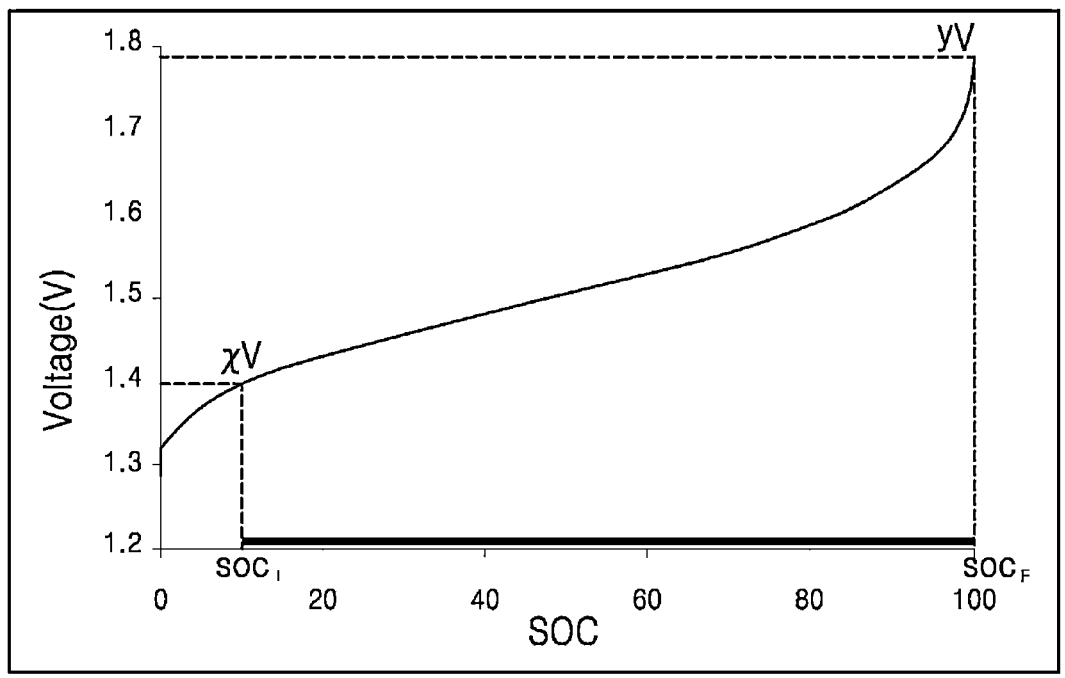
FIG. 5 shows an OCV graph of the separator A used for setting operating conditions in Example 1 of the present invention.

Next, the second operating condition setting unit 308 sets operating conditions of the redox flow battery based on the minimum state of charge value and the maximum state of charge value determined as above. FIG. 5 shows an OCV graph of the separator A used for setting operating conditions in Example 1 of the present invention. The second operating condition setting unit 308 detects a minimum voltage corresponding to the minimum state of charge value and a maximum voltage corresponding to the maximum state of charge value using the OCV graph of the redox flow battery as shown in FIG. 5.

For example, in FIG. 5, a voltage (xV) corresponding to the minimum state of charge value (45) is determined as the minimum voltage and a voltage yV corresponding to the maximum state of charge value (100) is determined as the maximum voltage. The second operating condition setting unit 308 sets the minimum voltage and the maximum voltage as operating voltages of the redox flow battery.

Figure 6:
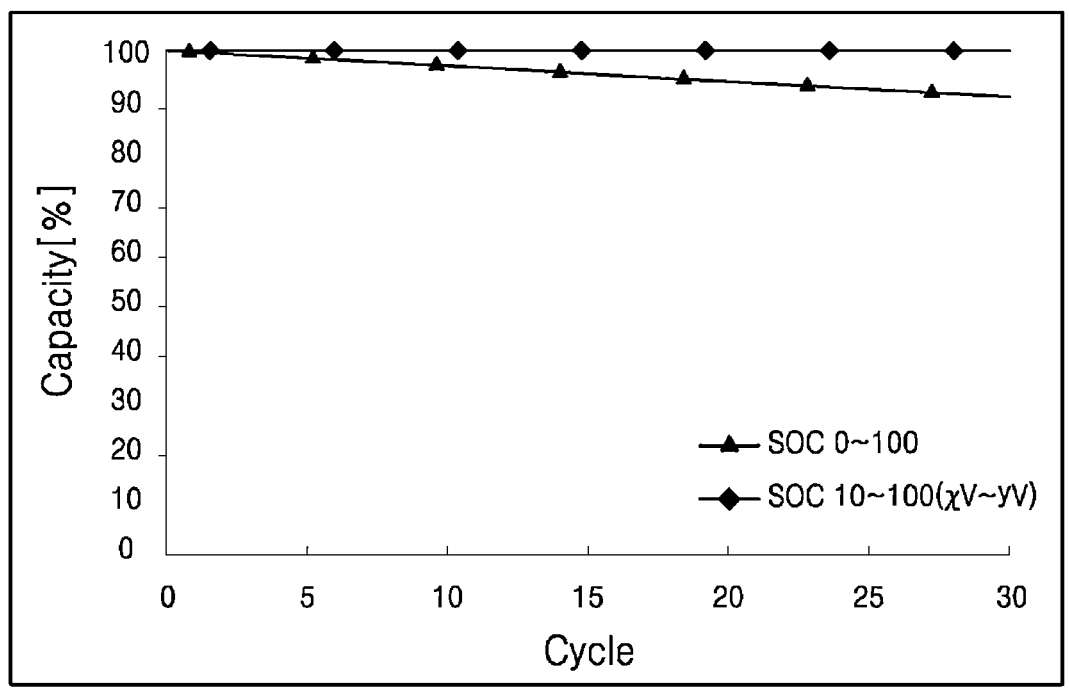
FIG. 6 is a graph depicting capacity variation of a redox flow battery under the operating conditions set in Example 1 of the present invention, which is compared with capacitance variation under typical conditions in the related art.

FIG. 6 is a graph depicting capacity variation of a redox flow battery under the operating conditions set in Example 1 of the present invention, which is compared with capacity variation under typical conditions.

Referring to FIG. 6, in operation of the redox flow battery using the separator A under typical conditions with a state of charge value in the range of 0 to 100, capacity of the battery is gradually decreased with increasing cycles of operating the battery. On the contrary, it can be confirmed in FIG. 6 that, when the redox flow battery is operated under conditions according to the present invention (a state of charge value of 10~100 and an operating voltage of xV~yV), capacity reduction of the redox flow battery is strongly suppressed, as compared with that of the redox flow battery operated under typical conditions.

EXAMPLE 2

In Example 2, operating conditions of a redox flow battery using separator B are set as follows.

First, each of diffusivities of anolyte ions and catholyte ions with respect to the separator B is measured. Anolyte ions ($V^{4+}$, $V^{5+}$) and catholyte ions ($V^{2+}$, $V^{3+}$) have the following diffusivities with respect to the separator B, as measured by a method known in the art.

Diffusivity of $V^{2+}$ ions with respect to separator B: 1.0
Diffusivity of $V^{3+}$ ions with respect to separator B: 2.7
Diffusivity of $V^{4+}$ ions with respect to separator B: 1.8
Diffusivity of $V^{5+}$ ions with respect to separator B: 2.1

After obtaining such diffusivities of the anolyte ions and catholyte ions with respect to the separator B, the diffusivity determination unit 304 determines electrolyte diffusivities, that is, an anolyte diffusivity and a catholyte diffusivity, depending upon state of charge values according to Equation 1 and Equation 2, based on the diffusivity of the anolyte ions and the diffusivity of the catholyte ions obtained as above. Thereafter, the diffusivity determination unit 304 generates a graph depicting the electrolyte diffusivities depending upon state of charge values based on the anolyte diffusivity and the catholyte diffusivity determined as above.

Figure 7:
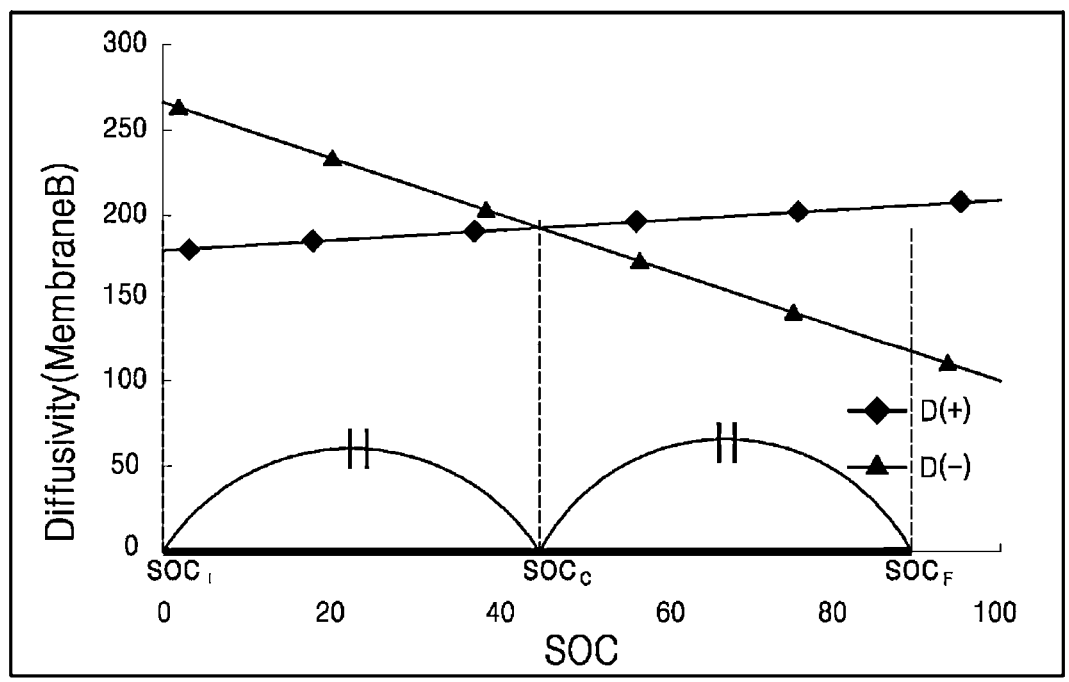
FIG. 7 is a graph depicting electrolyte diffusivities with respect to separator B in Example 2 of the present invention.

FIG. 7 is a graph depicting electrolyte diffusivities with respect to the separator B in Example 2 of the present invention. In FIG. 7, the abscissa indicates state of charge values, the ordinate indicates diffusivities, and numerals of the ordinate are given by scaling measured diffusivities by 100 times for convenience of comparison.

In FIG. 7, D(+) indicates an anolyte diffusivity and D(−) indicates a catholyte diffusivity. The diffusivity determination unit 304 determines the obtained diffusivity (1.8) of $V^{4+}$ ions as an anolyte diffusivity when the redox flow battery has a state of charge value of 0, and determines the obtained diffusivity (2.1) of $V^{5+}$ ions as an anolyte diffusivity when the redox flow battery has a state of charge value of 100, in which a straight line connecting the obtained diffusivities indicates anolyte diffusivities with respect to the separator B.

Similarly, the diffusivity determination unit 304 determines the obtained diffusivity (2.7) of $V^{3+}$ ions as a catholyte diffusivity when the redox flow battery has a state of charge value of 0, and determines the obtained diffusivity (1.0) of $V^{2+}$ ions as a catholyte diffusivity when the redox flow battery has a state of charge value of 100, in which a straight line connecting the obtained diffusivities indicates catholyte diffusivities with respect to the separator B.

The first operating condition setting unit 306 determines a minimum state of charge value and a maximum state of charge value of the redox flow battery based on the graph of the electrolyte diffusivity as shown in FIG. 7. The first operating condition setting unit 306 sets, as a medium state of charge value ($SOC_C$), a state of charge value when the anolyte diffusivity is coincident with the catholyte diffusivity, as shown in FIG. 7. Then, the minimum state of charge value ($SOC_I$) is determined by subtracting a certain value from the medium state of charge value, and the maximum state of charge value ($SOC_F$) is determined by adding the certain value to the medium state of charge value.

For example, in FIG. 7 in which the medium state of charge value is 45, the maximum state of charge value is determined to be 45+45=90 and the minimum state of charge value is determined to be 45−45=0.

Figure 8:
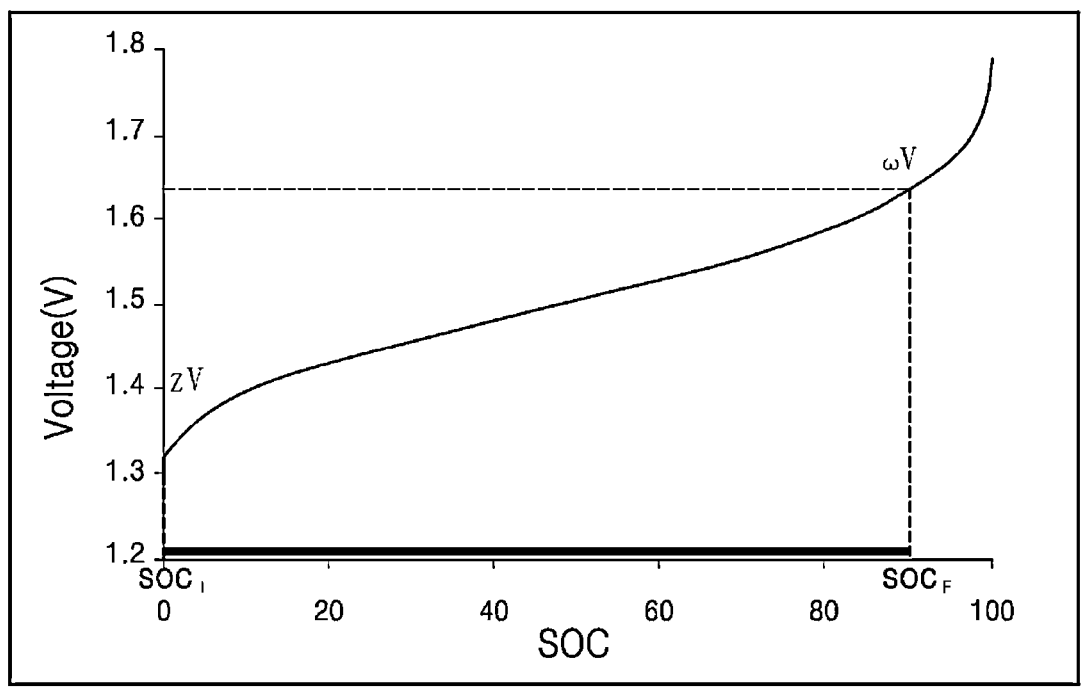
FIG. 8 shows an OCV graph of the separator A used for setting operating conditions in Example 2 of the present invention.

Next, the second operating condition setting unit 308 sets operating conditions of the redox flow battery based on the minimum state of charge value and the maximum state of charge value determined as above. FIG. 8 shows an OCV graph of the separator B used for setting operating conditions in Example 2 of the present invention. The second operating condition setting unit 308 detects a minimum voltage corresponding to the minimum state of charge value and a maximum voltage corresponding to the maximum state of charge value using the OCV graph of the redox flow battery as shown in FIG. 8.

For example, in FIG. 8, a voltage (zV) corresponding to the minimum state of charge value (45) is determined as the minimum voltage and a voltage ωV corresponding to the maximum state of charge value (100) is determined as the maximum voltage. The second operating condition setting unit 308 sets the minimum voltage and the maximum voltage as operating voltages of the redox flow battery.

Figure 9:
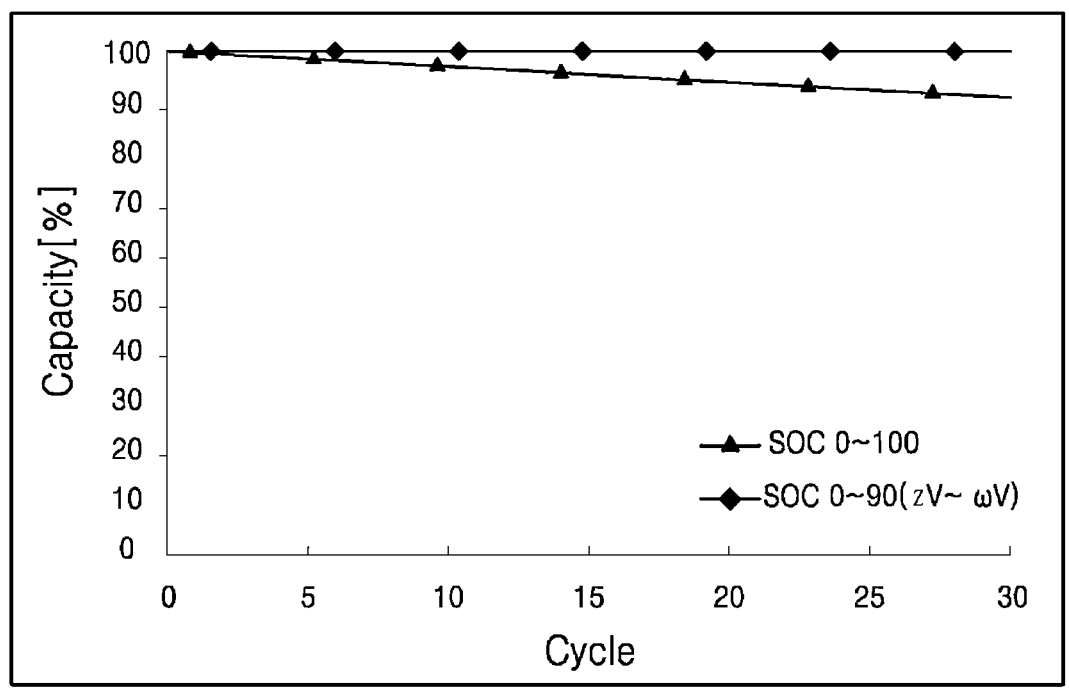
FIG. 9 is a graph depicting capacity variation of a redox flow battery under the operating conditions set in Example 2 of the present invention, which is compared with capacity variation under typical conditions in the related art.

FIG. 9 is a graph depicting capacity variation of a redox flow battery under the operating conditions set in Example 2 of the present invention, which is compared with capacity variation under typical conditions.

Referring to FIG. 9, in operation of the redox flow battery using the separator B under typical conditions with a state of charge value in the range of 0 to 100, capacity of the battery is gradually decreased with increasing cycles of operating the battery. On the contrary, it can be confirmed in FIG. 9 that, when the redox flow battery is operated under conditions according to the present invention (a state of charge value of 0~90 and an operating voltage of zV~ωV), capacity reduction of the redox flow battery is strongly suppressed, as compared with that of the redox flow battery operated under typical conditions.

EXAMPLE 3

In Example 3, operating conditions of a redox flow battery using NAFION 115 as a separator are set as follows.

First, each of diffusivities of anolyte ions and catholyte ions with respect to NAFION 115 is measured. Anolyte ions ($V^{4+}$, $V^{5+}$) and catholyte ions ($V^{2+}$, $V^{3+}$) have the following diffusivities with respect to NAFION 115, as measured by a method known in the art.

Diffusivity of $V^{2+}$ ions with respect to NAFION 115: 6.4
Diffusivity of $V^{3+}$ ions with respect to NAFION 115: 1.0
Diffusivity of $V^{4+}$ ions with respect to NAFION 115: 2.6
Diffusivity of $V^{5+}$ ions with respect to NAFION 115: 1.2

After obtaining such diffusivities of the anolyte ions and catholyte ions with respect to NAFION 115, the diffusivity determination unit 304 determines electrolyte diffusivities, that is, an anolyte diffusivity and a catholyte diffusivity, based on the diffusivity of the anolyte ions and the diffusivity of the catholyte ions obtained as above. Thereafter, the diffusivity determination unit 304 generates a graph depicting the electrolyte diffusivities depending upon state of charge values based on the anolyte diffusivity and the catholyte diffusivity determined as above.

Figure 10:
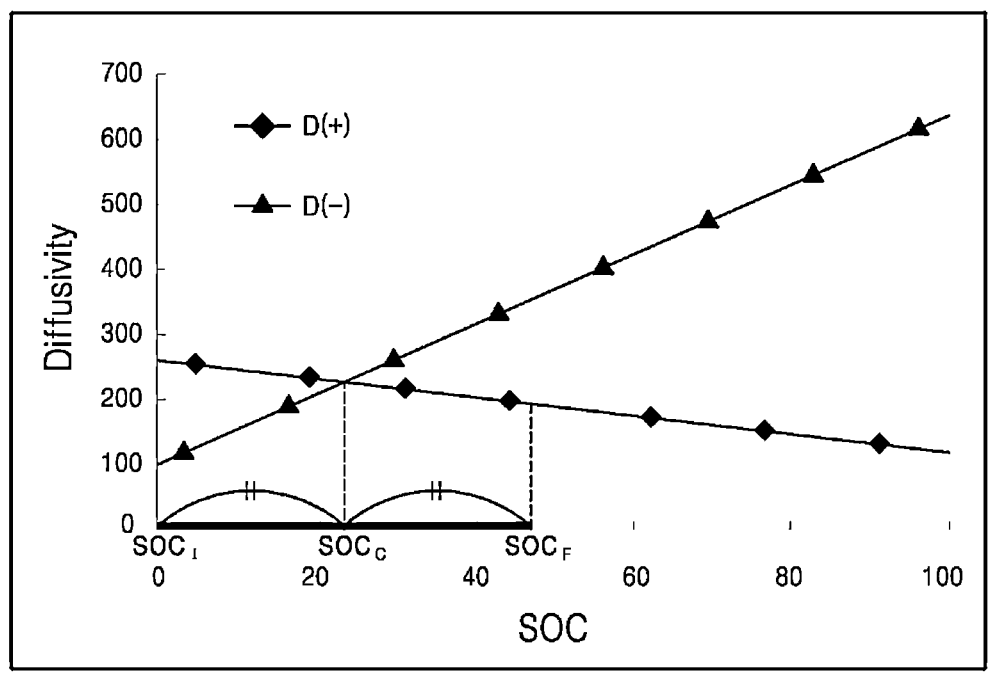
FIG. 10 is a graph depicting electrolyte diffusivities with respect to a separator NAFION115 in Example 3 of the present invention.

FIG. 10 is a graph depicting electrolyte diffusivities with respect to NAFION 115 in Example 3 of the present invention. The diffusivity determination unit 304 determines the obtained diffusivity (2.6) of $V^{4+}$ ions as an anolyte diffusivity when the redox flow battery has a state of charge value of 0, and determines the obtained diffusivity (1.2) of $V^{5+}$ ions as an anolyte diffusivity when the redox flow battery has a state of charge value of 100, in which a straight line connecting the obtained diffusivities to each other indicates anolyte diffusivities with respect to NAFION 115.

Similarly, the diffusivity determination unit 304 determines the obtained diffusivity (1.0) of $V^{3+}$ ions as a catholyte diffusivity when the redox flow battery has a state of charge value of 0, and determines the obtained diffusivity (6.4) of $V^{2+}$ ions as a catholyte diffusivity when the redox flow battery has a state of charge value of 100, in which a straight line connecting the obtained diffusivities indicates catholyte diffusivities with respect to NAFION 115.

The first operating condition setting unit 306 determines a minimum state of charge value and a maximum state of charge value of the redox flow battery based on the graph of the electrolyte diffusivity as shown in FIG. 10. As described in Example 1 and Example 2, the first operating condition setting unit 306 determines a minimum state of charge value ($SOC_I$) by subtracting a certain value from a medium state of charge value ($SOC_C$), and determines a maximum state of charge value ($SOC_F$) by adding the certain value to the medium state of charge value. In FIG. 10, since the medium state of charge value is 25, the minimum state of charge value is 0 and the maximum state of charge value is 50.

Next, the second operating condition setting unit 308 detects a minimum voltage corresponding to the minimum state of charge value and a maximum voltage corresponding to the maximum state of charge value using an OCV graph of the redox flow battery.

Figure 11:
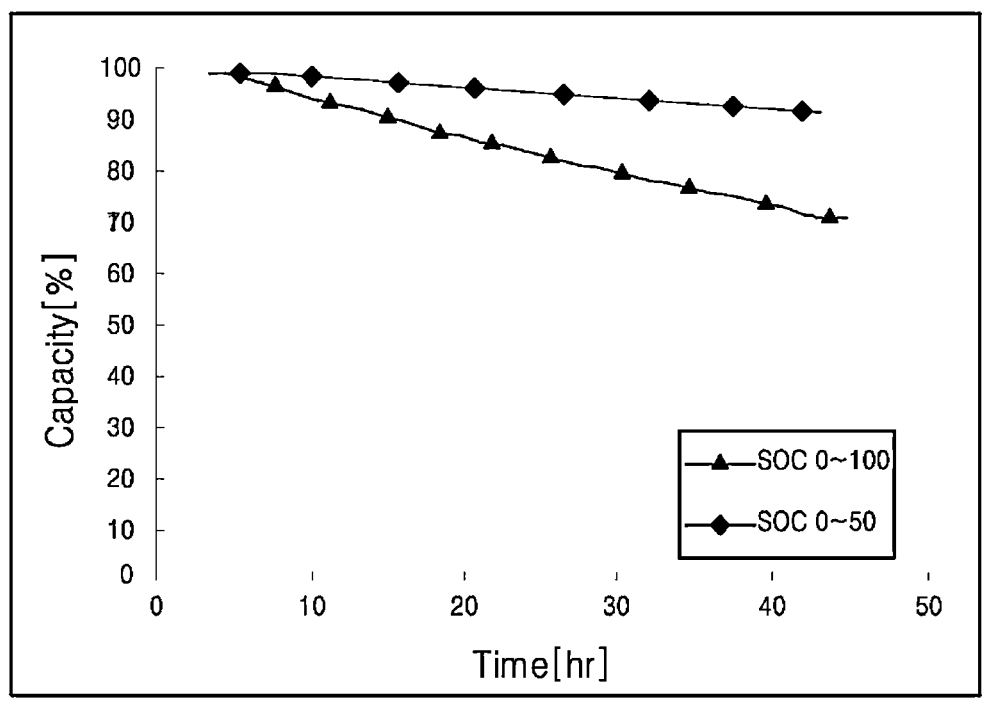
FIG. 11 is a graph depicting capacity variation of a redox flow battery under the operating conditions set in Example 3 of the present invention, which is compared with capacitance variation under typical conditions in the related art.

FIG. 11 is a graph depicting capacity variation of a redox flow battery under the operating conditions in Example 3 of the present invention, which is compared with capacity variation under typical conditions.

Referring to FIG. 11, in operation of the redox flow battery using NAFION 115 under typical conditions with a state of charge value in the range of 0 to 100, capacity of the battery is gradually decreased with increasing cycles of operating the battery. On the contrary, it can be confirmed in FIG. 11 that, when the redox flow battery is operated under conditions of the minimum voltage and the maximum voltage set according to the present invention, capacity reduction of the redox flow battery is strongly suppressed, as compared with that of the redox flow battery operated under typical conditions.

FIG. 12 is a flowchart of a method of controlling operation of a redox flow battery according to one embodiment of the present invention.

Referring to FIG. 12, first, a diffusivity of anolyte ions with respect to the separator and a diffusivity of catholyte ions with respect to the separator are obtained in Step 1202. The diffusivities of the anolyte ions and the catholyte ions with respect to the separator may be experimentally obtained by a typical method or apparatus for measuring diffusivity.

Then, electrolyte diffusivities are determined based on the diffusivity of the anolyte ions and the diffusivity of the catholyte ions in Step 1204. In one embodiment of the invention, Step 1204 may include calculating an anolyte diffusivity depending upon a state of charge value of the redox flow battery, calculating a catholyte diffusivity depending upon the state of charge value of the redox flow battery, and generating a graph representing electrolyte diffusivities.

Next, a minimum state of charge value and a maximum state of charge value of the redox flow battery are determined based on the electrolyte diffusivities in Step 1206. In one embodiment of the invention, Step 1206 may include setting a state of charge value when the anolyte diffusivity is coincident with the catholyte diffusivity as a medium state of charge value, and determining the minimum state of charge value and the maximum state of charge value according to Equation 3.

Last, operating conditions of the redox flow battery are determined based on the minimum state of charge value and the maximum state of charge value in Step 1208. In one embodiment of the invention, Step 1208 may include detecting a minimum voltage corresponding to the minimum state of charge value and a maximum voltage corresponding to the maximum state of charge value using an OCV graph of the redox flow battery, and setting the minimum voltage and the maximum voltage as operating voltages of the redox flow battery.

Although some embodiments have been described herein, it should be understood that various modifications, changes, alterations, and equivalent embodiments can be made by those skilled in the art without departing from the spirit and scope of the invention. Therefore, the scope of the invention should be limited only by the accompanying claims and equivalents thereof.

What is claimed is:

1. A method of controlling operation of a redox flow battery, comprising:
    obtaining a diffusivity of anolyte ions with respect to a separator;
    obtaining a diffusivity of catholyte ions with respect to the separator;
    determining electrolyte diffusivities depending upon a state of charge value of the redox flow battery based on the diffusivity of the anolyte ions and the diffusivity of the catholyte ions;
    determining a minimum state of charge value and a maximum state of charge value of the redox flow battery based on the electrolyte diffusivities; and
    setting operating conditions of the redox flow battery based on the minimum state of charge value and the maximum state of charge value.

2. The method of controlling operation of a redox flow battery according to claim 1, wherein determining the electrolyte diffusivities comprises:
    determining an anolyte diffusivity depending upon the state of charge value of the redox flow battery based on the diffusivity of the anolyte ions; and
    determining a catholyte diffusivity depending upon the state of charge value of the redox flow battery based on the diffusivity of the catholyte.

3. The method of controlling operation of a redox flow battery according to claim 2, wherein the anolyte ions comprise m-valence ions and (m+1)-valence ions (m being an integer), and the anolyte diffusivity satisfies Equation 1;

$$\text{Anolyte diffusivity} = \text{state of charge value} \times (\text{diffusivity of } (m+1)\text{-valence ions}) + (100 - \text{state of charge value}) \times (\text{diffusivity of } m\text{-valence ions}).$$ [Equation 1]

4. The method of controlling operation of a redox flow battery according to claim 2, wherein the catholyte ions comprise n-valence ions and (n+1)-valence ions (n being an integer), and the catholyte diffusivity satisfies Equation 2;

$$\text{Catholyte diffusivity} = \text{state of charge value} \times (\text{diffusivity of } n\text{-valence ions}) + (100 - \text{state of charge value}) \times (\text{diffusivity of } (n+1)\text{-valence ions}).$$ [Equation 2]

5. The method of controlling operation of a redox flow battery according to claim 2, wherein determining the minimum state of charge value and the maximum state of charge value of the redox flow battery comprises:
    setting a state of charge value when the anolyte diffusivity is coincident with the catholyte diffusivity as a medium state of charge value; and
    determining the minimum state of charge value and the maximum state of charge value according to Equation 3;

$$\text{Minimum state of charge value} = \text{medium state of charge value} - P$$

$$\text{Maximum state of charge value} = \text{medium state of charge value} + Q \quad \text{[Equation 3]}$$

(P and Q being the same integers greater than 0; the minimum state of charge value being greater than or equal to 0; and the maximum state of charge value being less than or equal to 100).

6. The apparatus for controlling operation of a redox flow battery according to claim 5, wherein the second operating condition setting unit detects a minimum voltage corresponding to the minimum state of charge value and a maximum voltage corresponding to the maximum state of charge value using an OCV graph of the redox flow battery, and sets the minimum voltage and the maximum voltage as operating voltages of the redox flow battery.

7. The method of controlling operation of a redox flow battery according to claim 1, wherein setting the operating conditions of the redox flow battery comprises:
    detecting a minimum voltage corresponding to the minimum state of charge value and a maximum voltage corresponding to the maximum state of charge value using an open circuit voltage (OCV) graph of the redox flow battery; and
    setting the minimum voltage and the maximum voltage as operating voltages of the redox flow battery.

8. The method of controlling operation of a redox flow battery according to claim 1, wherein obtaining the diffusivity of anolyte ions and obtaining the diffusivity of catholyte ions are performed when variation in temperature of the redox flow battery is detected.

9. An apparatus for controlling operation of a redox flow battery, comprising:
 a diffusivity determination unit that obtains a diffusivity of anolyte ions with respect to a separator and a diffusivity of catholyte ions with respect to the separator and determines electrolyte diffusivities depending upon a state of charge value of the redox flow battery based on the diffusivity of the anolyte ions and the diffusivity of the catholyte ions;
 a first operating condition setting unit that sets a minimum state of charge value and a maximum state of charge value of the redox flow battery based on the electrolyte diffusivities; and
 a second operating condition setting unit that sets operating conditions of the redox flow battery based on the minimum state of charge value and the maximum state of charge value.

10. The apparatus for controlling operation of a redox flow battery according to claim 9, wherein the diffusivity determination unit determines an anolyte diffusivity depending upon the state of charge value of the redox flow battery based on the diffusivity of the anolyte ions, and determines a catholyte diffusivity depending upon the state of charge value of the redox flow battery based on the diffusivity of the catholyte.

11. The apparatus for controlling operation of a redox flow battery according to claim 10, wherein the anolyte ions comprises m-valence ions and (m+1)-valence ions (m being an integer), and the anolyte diffusivity satisfies Equation 1;

$$\text{Anolyte diffusivity} = \text{state of charge value} \times (\text{diffusivity of } (m+1)\text{-valence ions}) + (100 - \text{state of charge value}) \times (\text{diffusivity of } m\text{-valence ions}). \quad \text{[Equation 1]}$$

12. The apparatus for controlling operation of a redox flow battery according to claim 10, wherein the catholyte ions comprise n-valence ions and (n+1)-valence ions (n being an integer), and the catholyte diffusivity satisfies Equation 2;

$$\text{Catholyte diffusivity} = \text{state of charge value} \times (\text{diffusivity of } n\text{-valence ions}) + (100 - \text{state of charge value}) \times (\text{diffusivity of } (n+1)\text{-valence ions}). \quad \text{[Equation 2]}$$

13. The apparatus for controlling operation of a redox flow battery according to claim 10, wherein the first operating condition setting unit sets a state of charge value when the anolyte diffusivity is coincident with the catholyte diffusivity as a medium state of charge value, and determines the minimum state of charge value and the maximum state of charge value according to Equation 3;

$$\text{Minimum state of charge value} = \text{medium state of charge value} - P$$

$$\text{Maximum state of charge value} = \text{medium state of charge value} + Q \quad \text{[Equation 3]}$$

(P and Q being the same integers greater than 0; the minimum state of charge value being greater than or equal to 0; and the maximum state of charge value being less than or equal to 100).

14. The apparatus for controlling operation of a redox flow battery according to claim 9, wherein the diffusivity determination unit obtains the diffusivity of anolyte ions and the diffusivity of catholyte when variation in temperature of the redox flow battery is detected.

* * * * *